United States Patent [19]

Shalov et al.

[11] Patent Number: 5,830,937

[45] Date of Patent: Nov. 3, 1998

[54] COATING AND WEARLAYER COMPOSITIONS FOR SURFACE COVERINGS

[75] Inventors: Allen A. Shalov, Freehold; Anthony N. Piacente, Lawrenceville, both of N.J.

[73] Assignee: Congoleum Corporation, Mercerville, N.J.

[21] Appl. No.: 66,568

[22] Filed: May 25, 1993

Related U.S. Application Data

[63] Continuation-in-part of Ser. No. 940,438, Sep. 4, 1992, abandoned, and Ser. No. 830,727, Feb. 4, 1992.

[51] Int. Cl.$^6$ .................................................. C08L 31/06
[52] U.S. Cl. ......................... 524/297; 524/567; 524/569; 524/914; 428/502
[58] Field of Search ..................................... 524/297, 914, 524/567, 569; 428/502

[56] References Cited

U.S. PATENT DOCUMENTS

| | | | |
|---|---|---|---|
| 2,793,136 | 5/1957 | Root | 428/147 |
| 2,921,918 | 1/1960 | Mooney et al. | 523/150 |
| 3,015,640 | 1/1962 | Weaver et al. | 264/152 |
| 3,293,094 | 12/1966 | Nairn et al. | 156/79 |
| 3,293,108 | 12/1966 | Nairn et al. | 428/159 |
| 3,356,634 | 12/1967 | McGinley | 524/524 |
| 3,450,563 | 6/1969 | Krueger | 428/151 |
| 3,527,146 | 9/1970 | Garling | 404/19 |
| 3,563,936 | 2/1971 | Merrill et al. | 524/297 |
| 3,573,237 | 3/1971 | Zola | 523/455 |
| 3,657,390 | 4/1972 | Tanaka et al. | 525/83 |
| 3,658,752 | 4/1972 | Das et al. | 524/496 |
| 3,660,187 | 5/1972 | Shortway | 156/79 |
| 3,811,904 | 5/1974 | Zola | 523/171 |
| 3,917,550 | 11/1975 | Clas et al. | 524/297 |
| 3,941,737 | 3/1976 | Hortskorte | 524/533 |
| 3,997,704 | 12/1976 | Aurichio | 428/515 |
| 4,100,318 | 7/1978 | McCann et al. | 428/159 |
| 4,100,325 | 7/1978 | Summers et al. | 428/334 |
| 4,126,727 | 11/1978 | Kaminski | 428/172 |
| 4,129,681 | 12/1978 | Anderson et al. | 428/524 |
| 4,196,243 | 4/1980 | Sachs et al. | 428/147 |
| 4,210,567 | 7/1980 | Kosters | 524/290 |
| 4,225,688 | 9/1980 | Dennehey et al. | 525/444 |
| 4,263,366 | 4/1981 | Lorenz et al. | 428/332 |
| 4,273,819 | 6/1981 | Schmidle et al. | 428/159 |

(List continued on next page.)

FOREIGN PATENT DOCUMENTS 3543266  6/1986  Germany .
63-264654  11/1988  Japan .

OTHER PUBLICATIONS

"Acrylic Monomers in PVC Plastisols," Sartomer Company, Reprintd from SPE Journal, vol. 29, No. 2 Feb. 1973.
"Basic Principles of Peroxide–Coagent Curing of Elastomers," Sartomer Company, Date Unknown.
"Functional Acrylic Monomers as Modifiers for PVC Platisol Formulations," Weaver, David L., Reprinted from Journal of Vinyl Technology, Jun. 1990, vol. 12, No. 2.
Modern Plastics Encyclopedia 1989, pp. 177–184 missing pp. 183, 181.
"Acrylated Melamines in UV Cured Coatings", For Dallas ACS, Gummeson, Joel J., Monsanto Chemical Company, Apr., 1989.

Primary Examiner—Vasu Jagannathan
Assistant Examiner—John J. Guarriello
Attorney, Agent, or Firm—Synnestvedt & Lechner

[57] ABSTRACT

Disclosed are coating compositions, wearlayer compositions and surface covering products which utilize wearlayer compositions. The wearlayer compositions of the present invention are capable of at once exhibiting high initial gloss values and excellent resistance to scuff, stain and gloss loss. Such wearlayer compositions are produced utilizing curable coating compositions which comprise thermoplastic polymer, from about 3% by weight to about 25% by weight of plasticizer for the thermoplastic polymer and at least about 30% by weight of reactive crosslinking agent. The weight ratio of the thermoplastic polymer to the crosslinking agent is preferably no greater than about 2:1.

20 Claims, 1 Drawing Sheet

U.S. PATENT DOCUMENTS

| | | | |
|---|---|---|---|
| 4,274,916 | 6/1981 | Grose | 162/145 |
| 4,281,091 | 7/1981 | Strazik et al. | 525/518 |
| 4,293,461 | 10/1981 | Strazik et al. | 525/517.5 |
| 4,333,987 | 6/1982 | Kwart et al. | 428/419 |
| 4,337,296 | 6/1982 | Varadhachary | 428/420 |
| 4,361,626 | 11/1982 | Boba et al. | 428/420 |
| 4,379,000 | 4/1983 | Biggin et al. | 106/311 |
| 4,382,135 | 5/1983 | Sinka et al. | 526/301 |
| 4,389,514 | 6/1983 | Schmidle et al. | 525/364 |
| 4,393,187 | 7/1983 | Boba et al. | 528/60 |
| 4,423,178 | 12/1983 | Renshaw | 524/287 |
| 4,443,585 | 4/1984 | Goldman | 525/310 |
| 4,491,616 | 1/1985 | Schmidle et al. | 428/158 |
| 4,501,783 | 2/1985 | Hiragami et al. | 428/147 |
| 4,517,327 | 5/1985 | Heaps et al. | 524/315 |
| 4,554,319 | 11/1985 | Heaps et al. | 525/155 |
| 4,582,894 | 4/1986 | Pfohl | 528/250 |
| 4,634,738 | 1/1987 | Santer | 525/162 |
| 4,717,620 | 1/1988 | Bowen et al. | 428/323 |
| 4,781,987 | 11/1988 | Bolgiano et al. | 428/424.6 |
| 4,808,652 | 2/1989 | Gardner | 524/376 |
| 4,824,911 | 4/1989 | Chu | 525/199 |
| 4,935,286 | 6/1990 | Witman | 428/195 |
| 5,003,026 | 3/1991 | Ehrhart et al. | 528/49 |
| 5,039,762 | 8/1991 | Demarey | 525/509 |
| 5,079,315 | 1/1992 | Demarey | 525/509 |
| 5,281,674 | 1/1994 | Klaiber et al. | 525/281 |
| 5,288,523 | 2/1994 | Klaiber et al. | 427/385.5 |

FIG. 1

FIG. 2

COATING AND WEARLAYER COMPOSITIONS FOR SURFACE COVERINGS

CROSS-REFERENCE TO RELATED APPLICATION

The present application is a continuation-in-part of application Ser. No. 07/940,438, filed Sep. 4, 1992, now abandoned, and a continuation-in-part of copending application Ser. No. 07/830,727, filed Feb. 4, 1992, now pending, each of which is incorporated herein by reference and which is assigned to the assignee of the present invention.

FIELD OF THE INVENTION

The present invention relates to coating compositions, to wearlayer compositions and to surface covering products which utilize wearlayer compositions. The compositions of the present invention are especially well adapted for use as wearlayers in floor, wall, and ceiling coverings.

Surface covering materials, and especially surface covering materials adapted for use as floor and wall coverings, must frequently possess a wide range of sometimes contradictory properties and characteristics. For example, there has been an increasing demand, especially in the United States, for floor covering materials having a glossy surface. Furthermore, it is highly desirable for such floor covering materials to possess a high degree of gloss retention when subject to wear of the type encountered during normal use. The current state of the art in this regard relies primarily on the use of polyurethane coating compositions to provide a durable, high gloss surface appearance.

While polyurethane surface coatings have achieved a significant degree of success in the flooring industry, there has been a general recognition that several disadvantages are associated with such surface coverings. For example, it is generally accepted that high gloss polyurethane coatings can be formulated to possess a high degree of gloss retention. However, it is equally well established that gloss retentive polyurethane coatings generally exhibit a poor resistance to staining. Nevertheless, both of these properties are extremely important to the production of a commercially successful surface covering products, especially a surface covering which is exposed to the conditions encountered by flooring materials.

On the other hand, it is possible to formulate polyurethane coating compositions that have improved stain resistance. Unfortunately, however, it is also generally recognized that such improvements in stain and scratch resistance can only be obtained at the expense of gloss durability. That is, polyurethane coating compositions which are formulated to exhibit improved resistance to staining will also generally exhibit a high level of gloss loss during the wearing process.

Polyurethane surface coating compositions also suffer from the disadvantage of being relatively expensive. Due at least in part to this cost constraint, only very thin layers of polyurethane, for example about 1 mil, are included as the wear surface in typical floor and wall covering materials. Furthermore, such thin coatings are frequently required in order to avoid the brittleness and cracking which is sometimes associated with thicker layers of cured polyurethane.

The practical requirement that urethane coatings be applied to floor and wall covering materials in such thin layers produces distinct disadvantages. For example, it is difficult to provide a polyurethane coated floor or wall covering with enhanced wear properties without significantly increasing the cost of the product. This situation results because improved polyurethane wear surfaces are typically obtained by increasing the thickness of the polyurethane layer. Because of the cost and brittleness of polyurethane layers, a polyurethane coated floor or wall covering product with such improved wear characteristics is not practically obtainable.

The current requirement that polyurethane coatings be applied in a thin layer also produces further difficulty because of the relatively high viscosity of such typical coatings. For example, urethane coating compositions frequently have room temperature viscosities ranging from about 1,000 to about 1,500 centipoise (hereinafter "cps"). Owing to such high viscosities, polyurethane coating compositions are generally thick and possess poor spreadability. It is therefore difficult to apply a desirably thin layer of such coating compositions onto the support surface of the flooring product without relatively costly processing procedures. For example, it is sometimes required to pre-heat the coating composition prior to application so as to permit the use of standard coating equipment. In other situations, the polyurethane coating composition is formulated to include non-reactive, low viscosity solvents, for example, organic solvents and water-based urethane lattices. While the resulting coating composition is of a generally lower viscosity, many of the heretofore used solvents are highly toxic and pose environmental hazards. In addition, the solvent must be removed, generally by heating, after applying the coating composition on the support surfaces. Such removal of the solvents requires additional processing steps and results in environmental disadvantages to the manufacture of the floor covering products.

Another processing difficulty is encountered when many of the heretofore used surface coating compositions are applied to the surface of a support layer which comprises polyvinyl chloride resin (PVC). For example, in order to ensure acceptable bonding of polyurethane wearlayers to such underlying PVC support layers, it has heretofore been necessary to treat the surface of the underlying support layer. In one frequently used technique, the surface of the polyvinyl chloride support layer is pretreated with an acid wash to ensure adequate bonding of the polyurethane coating. This step can be expensive and time consuming.

Surface coating compositions based on materials other than polyurethane have been suggested. For example, DE 3543266 suggests the use of a brushable coating composition comprising polyvinyl chloride resin and UV-curable, polyfunctional acrylate monomers. This patent indicates that the resulting wearlayer will have excellent high temperature properties, specifically resistance to ignition and fire. Applicants expect, however, that the compositions disclosed in this patent will exhibit significant disadvantages in other respects. For example, it is expected that the cured coatings described in DE 3543266 patent will exhibit poor scuff resistance, poor scratch resistance, and/or poor resistance to stain. It is also expected that the compositions described in this patent will not exhibit the gloss retention which is characteristic of the present invention.

Accordingly, it is an object of the present invention to provide improved coating compositions adaptable for use with resilient surface coverings.

It is a further object of the present invention to provide cost-effective resilient surface coverings and wearlayer compositions therefore.

It is yet a further object of certain aspects of the present invention to provide low viscosity, UV curable coating compositions for resilient surface coverings which may be applied to surfaces in a substantially thin coating.

It is another object of the present invention to provide a cured coating for floor or wall coverings which at once exhibits excellent gloss retention properties, excellent stain resistance and excellent resistance to scuff.

It is a further object according to certain embodiments of the present invention to provide cured coating compositions having excellent wear properties and high initial gloss levels.

It is a further object according to certain embodiments of the present invention to provide a coating composition for wear surfaces which can be readily applied in thicknesses of from about 1 mil to about 5 mils.

It is a further object of certain embodiments of the present invention to provide wearlayer compositions having thicknesses of up to about 5 mils with good stain resistance, scuff resistance and gloss retention properties and which also possess flexibility and resistance to cracking.

SUMMARY OF THE INVENTION

The objects of the present invention can be achieved utilizing a composition comprising a thermoplastic polymer, plasticizer for the thermoplastic polymer, and crosslinking agent. A preferred thermoplastic polymer is polyvinyl chloride (PVC) polymer. Applicants have found when that when these three components are included in a coating composition in accordance with the teachings of the present invention, highly advantageous results can be achieved.

According to preferred embodiments, the present invention relates to coating compositions which comprise thermoplastic polymer, from about 3% by weight to about 25% by weight of plasticizer for the thermoplastic polymer, and at least about 30% by weight of reactive crosslinking agent, the weight ratio of said thermoplastic polymer to said crosslinking agent preferably being no greater than about 2:1.

DESCRIPTION OF THE PREFERRED EMBODIMENTS

I. THE COMPOSITIONS

The compositions of the present invention may exist in a fluid state or as a non-flowable solid. The fluid compositions are sometimes referred to for the purpose of convenience as coating compositions. It is contemplated that the present coating compositions may be formulated over a wide range of viscosities, for example, up to several thousand centipoise (cps) at room temperature. One distinct advantage of the present invention, however, is the ability to formulate the coating composition so as to have a relatively low viscosity. As explained more fully hereinafter, coating compositions having such relatively low viscosities permit the use of standard and inexpensive processing equipment and techniques to applying relatively thick coatings to a substrate. Furthermore, the present compositions are readily adaptable for use with "wide-width" floor covering products, that is products having a width of about 3 meters or more. Accordingly, the present coating compositions preferably have a room temperature viscosity of less than about 1,000 cps, more preferably from about 250 to about 1,000 cps, and even more preferably from about 250 cps to about 500 cps.

When the coating compositions are fused and cured as described hereinafter, they are converted to a wear resistant solid. In the fused and cured condition, the present compositions are sometimes referred to for the purpose of convenience as wearlayer compositions.

The present compositions generally comprise three important ingredients: thermoplastic polymer, plasticizer for the thermoplastic polymer and crosslinking agent. Applicants have found that the use of these ingredients in accordance with the proportions and ratios described herein provides compositions with highly desirable and difficult to obtain properties. The ability to obtain such a combination of desirable properties is surprising and thoroughly unexpected. For example, applicants have found that the coating compositions of the present invention are capable of producing wearlayers that are extremely resistant to scuffing, staining and scratching. Furthermore, wearlayers of the present invention are capable of possessing these properties over a wide range of initial gloss values. In accordance with certain embodiments of the present invention, applicants have found that it is possible to achieve a stain, scratch and scuff-resistant wearlayer which also possesses a high initial gloss value and exhibits excellent gloss retention properties. Wearlayers for floor and wall covering materials having this combination of properties have not heretofore been achieved to applicants knowledge.

A preferred embodiment of the present invention provides wearlayer compositions comprising plasticizer and a polymer composite, or blend, comprising the thermoplastic polymer and the cured cross-linking agent. As the term is used herein, "cured crosslinking agent" refers to the product which results from the polymerization or crosslinking of at least a portion, and preferably a substantial portion, of the crosslinking agent. The term polymer composite includes within its scope simple microscopically cellular mixtures of two or more polymers, interpenetrating polymer networks, graft copolymers, block copolymers and combinations of these. Thus, it is contemplated that one or more of the above-noted polymeric configurations may be included in the structure of the present wearlayer compositions.

Although applicants do not wish to be necessarily bound by or limited to any particular theory, it is believed that the ability of the preferred wearlayer compositions to exhibit the above-noted combination of beneficial properties is due, at least in part, to the physical and chemical relationship between the components of the present compositions. In particular, it is contemplated that the thermoplastic polymer and the cured crosslinking agent comprise an interpenetrating polymer network (IPN). It is believed that the presence of such a polymer network produced in accordance with the present invention results in a wearlayer having sufficient micro-elasticity to avoid scuffing, scratching and gloss loss while being sufficiently non-porous to be stain resistant. In addition, it is believed that such a configuration contributes to the high initial gloss of the present compositions.

As those skilled in the art are aware, interpenetrating polymer networks (IPNs) are a special class of polymer blends in which two or more polymers exist in a highly networked structure. As the term is used herein, interpenetrating polymer network refers to true IPNs, apparent IPNs, semi-IPNs, and combinations and hybrids of these. As the term is used herein, a true IPN refers to those polymer networks in which the polymers in a system of two or more polymers are cross-linked to themselves but not to each other. In such a network, the distinct polymer systems form networks that interpenetrate each other. As the term is used herein, a semi-IPN refers to those polymer networks in which one polymer system exists in an uncross-linked state while a second polymer system is cross-linked to itself. The term apparent IPN refers to co-continuous interpenetrating phases in which none of the polymers is chemically cross-linked but which is nevertheless stabilized by physical polymer cross-links.

It is contemplated that the preferred IPNs of the present invention may be formed using a variety of techniques and all such techniques are within the scope of the present invention. It is preferred, however, that the network structure be provided by compositions comprising cross-linked polymer in which at least a portion, and preferably substantially all of the cross-links are formed in the presence of the thermoplastic polymer. The preferred methods of forming the present wearlayer compositions are disclosed more fully hereinafter.

In certain embodiments of the present invention, the plasticizer portion of the composition may itself include polymer components, as explained more fully hereinafter. It is contemplated that in such embodiments, the plasticizer may participate in and be part of the IPN of the present invention.

The wearlayer compositions of the present invention preferably exhibit a scuff resistance which is characterized by an ability to pass the scuff test. Scuff resistance is one property that is an important measure of the quality of wearlayers used in floor and wall coverings. Scuff resistance is the measure of a wearlayer's ability to resist permanent surface deformation and/or the deposition of rubber and rubber-like materials as a result of frictional contact between such rubber-like materials and the wearlayer. Such a test is typically conducted using a sneaker attached to a pivoting swing arm. The sneaker is attached to one end of the swing arm and is made to rest under its own weight on the sample being tested. The pivot point of the swing arm is set to be 36 inches above the substrate. The radius of the swing arm is set so as to be perpendicular to the surface of the substrate. The scuff resistance of the sample is tested by dropping the sneaker onto the sample through a 90° (36") and a 180° (72") arc. The sample is observed for the appearance of a scuff mark. If no scuff is observed, then the scuff test is passed. If a scuff is made on the sample, the scuff should then be tested to see if it is repairable using Mr. Clean liquid cleanser. The repair is attempted by applying the Mr. Clean cleanser to a damp paper towel and gently rubbing the sample in an effort to repair the scuff. The sample is then rinsed with water and wiped clean. If the scuff is no longer visible to the naked eye after repair, the scuff test is passed.

Another important property for measuring the quality of a wearlayer used for floor and wall coverings is the stain resistance of the wearlayer. Stain resistance is the measure of the wearlayer's ability to resist permanent staining. The stain resistance of a wearlayer used in floor covering materials is measured by first preparing a 7"×12" sample of the material to be tested. Circular paper tape is applied to the surface of the sample to form a 1" internal diameter space surrounded by tape. The staining material is applied to the sample so as to fill the circular space formed by the tape. For liquid staining materials, such as dye, 5–10 drops of the liquid are applied with a dropping pipette. The sample is manipulated so as to cause the staining material to cover all the surface area inside the tape. For solid or paste-like staining materials, such as coal tar, shoe polish and mustard, the material is applied using a spatula or other applicator. The staining material is allowed to remain on the sample for approximately one-half hour. With respect to solid or paste-like stainants, excess material is removed from the sample with a spatula. For stains such as dye, the stained area is cleaned by rubbing with a paper towel wetted with distilled water. For stains such as mustard, shoe polish and coal tar, the stained area is cleaned by rubbing With a paper towel wetted with an organic solvent, such as Naphtha. The stain which remains after cleaning is observed by a trained observer and is reported according to the following numerical scale:

| Rating | Degree of Staining |
|--------|--------------------|
| 0 | None |
| 1 | Slight |
| 2 | Moderate |
| 3 | Considerable |
| 4 | Severe. |

It is conventional to measure the stain resistance of a floor covering wear layer using shoe polish, coal tar and mustard as staining materials.

The wearlayer compositions of the present invention preferably exhibit a shoe polish stain value of less than about 2, and even more preferably less than about 1. As will be appreciated by those skilled in the art, the ability of the wearlayer to resist staining by shoe polish is a very important characteristic of floor covering materials. Thus, the ability of the present wearlayer compositions to achieve a shoe polish stain value of less than about 1, and even more preferably no greater than about 0.5, is a highly desirable and beneficial property when the present wearlayers are components of floor covering materials.

The wearlayers of the present invention also preferably exhibit a coal tar stain resistance of less than about 2, more preferably less than about 1, and even more preferably no greater than about 0.5. Once again, it will be appreciated by those skilled in the art, that the ability of a wearlayer to resist coal tar stain is an important and desirable property since coal tar is an ingredient which is commonly used in asphalt paving.

The present compositions also preferably exhibit a mustard stain resistance of less than about 2, more preferably no greater than about 1, and even more preferably no greater than about 0.5.

Gloss level is another important factor in determining the value of a floor covering material. As is well known to those skilled in the art, the preferred gloss level of a wearlayer is ultimately a matter of taste and subjective aesthetics. For example, in certain applications it is deemed to be aesthetically beneficial for a wearlayer to be a high gloss wearlayer. As the term is used herein, "high gloss" refers to a gloss value of about 70° or greater. In other circumstances, it is desirable to have a low gloss wearlayer, or what is sometimes referred to as a dull or matte finish. As the term is used herein, "low gloss" refers to wearlayers having a gloss value of about 45° or less. Wearlayers having a gloss value of from about 45° to about 75° are sometimes referred to herein as "intermediate gloss" wearlayers.

For the purposes of this application, the numerical gloss value of any particular wearlayer is determined using a portable 60° gloss meter, or its equivalent, as supplied, for example, by Gardner Lab, Bethesda, Md., with high and low gloss calibration standards, Model GG-7360-B, range 0–200 Gardner units. The sample whose gloss is to be measured is prepared using a film blade to apply a coating to a thickness of about 0.01 inch. The coating is applied to an 8"×12" rectangular glass plate having a thickness of 0.09". The coating is fused at 400° F. in a circulating air oven, modified with a variable speed controlled rotating 8"×12" stainless steel shelf situated in the center of the oven. After fusion, an unlacquered white card, Scott® Index, 26.44M wt., 110 basis, Warren®, code 3015, or equivalent is placed under the glass having a fused film thereon. The gloss meter is placed over the sample and the gloss meter is operated according to manufacturer's instruction at three places on the sample. The average of the three readings is reported as the gloss of the sample.

One beneficial feature of the present coating compositions is the ability to produce a high gloss wearlayer. Applicants have found that when thermoplastic resin, plasticizer and crosslinking agent are selected and proportioned in accordance with the teachings contained herein, it is possible to obtain a cured and fused high gloss wearlayer. The formation of these components into an IPN is believed to contribute to this synergistic effect. Furthermore, the coating compositions of the present invention can be readily adapted to the production of intermediate gloss and low gloss wearlayers without a detrimental impact on the other important characteristics of the wearlayer. This variation in gloss level can be readily achieved without substantial detriment by the addition of certain flattening agents, as described more fully hereinafter. As the term is used herein, "unflattened gloss" refers to the gloss value of a wearlayer in the absence of a substantial amount of flattening agent.

Another important property of floor covering wearlayers is the ability of such layers to retain their initial level of gloss when exposed to conditions of use. This property is especially important for wearlayers which are formulated to have an initial gloss value of about 70° or greater. More specifically, a decrease in the gloss value of a wearlayer having a high initial gloss is more noticeable than a decrease in gloss for a wearlayer having a low initial gloss. The gloss retentive properties of a wearlayer used as a floor or wall covering are measured in accordance with the procedures set forth in ASTM D968-81 for the 3000 gram falling sand abrasion test.

For wearlayer compositions of the present invention having a high initial gloss level, it is preferred that such wearlayers have an average gloss loss of no greater than about 80%, more preferably no greater than about 75%, and even more preferably no greater than about 70%.

Without intending to be bound by or limited to any particular theory of operation, it is believed that the highly desirable combination of properties which may be achieved in accordance with the present invention is obtain as a result of synergistic interaction of the thermoplastic polymer, plasticizer and crosslinking agent of the present invention. Furthermore, the examples provided hereinafter illustrate that this unexpected synergistic effect is most pronounced when these three ingredients are incorporated into the present compositions in the proportions and/or in the manner described herein.

According to especially preferred embodiments, the present wearlayer compositions are at once scuff-resistant, and exhibit stain resistance properties for each of shoe polish, coal tar and mustard of less than about 2. According to more preferred embodiments, the present wearlayer compositions are at once scuff resistant, exhibit stain resistance properties for each of shoe polish, coal tar and mustard of less than about 2, and exhibit an average gloss loss of no greater than about 75%. In the most preferred embodiments of the present invention, the wearlayer is scuff resistant, has a stain resistance value of less than about 2 for each of shoe polish, coal tar and mustard, has an average gloss loss of no greater than about 75% and has an initial unflattened gloss of no less than about 70°.

In order to achieve wearlayer compositions which possess such an exceptional combination of properties, it is highly preferred that the present coating compositions comprise at least about 30% by weight of crosslinking agent, from about 20% to about 60% by weight of thermoplastic polymer and from about 3% to about 25% by weight of plasticizer.

Applicants have found that the relative proportions of the above-described ingredients are important in achieving many of the beneficial properties of the present invention. For example, it is believed that the scuff resistance which is characteristic of the present invention is exhibited substantially only for those compositions which comprise at least about 30% by weight of crosslinking agent. Furthermore, it is believed that the scuff resistance exhibited by the surface coverings of the present invention deteriorates rapidly when the weight ratio of the thermoplastic resin to the crosslinking agent is greater than about 2.0:1. Accordingly, it is preferred that the thermoplastic resin:crosslinking agent weight ratio be no greater than about 2.0:1, more preferably no greater than about 1.5:1, and even more preferably no greater than about 0.8:1.

Applicants have also found that the level of plasticizer in the present compositions is another factor having a significant influence on the beneficial properties of the present surface covering products. Although applicants do not intend to be bound by or limited to any particular theory, it is believed that at least about 3% by weight of plasticizer is required in the present compositions in order to achieve the beneficial flexibility and scratch resistance described herein. Furthermore, it is believed that the provision of plasticizer in an amount greater than about 25 wt. % of the composition will have a significant negative impact upon the stain resistance of wearlayers produced from such compositions.

According to certain preferred embodiments of the present invention, the coating compositions comprise from about 50 to about 65% by weight of crosslinking agent, from about 10% to about 45% by weight of thermoplastic polymer and from about 3% to about 20% by weight of plasticizer. One particularly preferred embodiment of the present invention comprises from about 55% to about 60% by weight of crosslinking agent, from about 25% to about 40% by weight of thermoplastic resin, and from about 10% to about 15% by weight of plasticizer.

As illustrated by the examples contained herein, coating formulations produced in accordance with the teachings of the present invention have characteristics and attributes which are not otherwise readily obtainable.

A. The Crosslinking Agent

As the term is used herein, "crosslinking agent" refers to compositions containing one or more compounds having reactive functionalities which participate in crosslinking and/or polymerization reactions when exposed to curing conditions of the general type described hereinafter. The crosslinking agent preferably comprises reactive monomeric compounds, reactive oligomeric compounds or mixtures of reactive monomers and reactive oligomers.

As the term is used herein, "reactive monomeric compound" refers to monomeric and dimeric compounds which have at least about one reactive functionality per molecule. It should be understood that the reactive monomers of the present invention may include oligomeric or polymeric segments with repeating units that are not related to the reactive functionality of the monomer. For the purposes of clarity, it should be understood that the terms "monomers," "monomeric," and the like refer to molecules having about two or less repeating units derived from or based on the reactive functionality of the molecule. Thus, the term "dimer" as used herein includes molecules which has about two repeating units connected through a linkage based upon the reactive functionality of the molecule. Furthermore, a compound having more than about two repeating units that are not related to or derived from the reactive functionality are nevertheless monomeric as that term is used herein. For example, polyethylene glycol 200 dimethacrylate is a difunctional reactive monomer in which the two reactive methacrylate functionalities are joined by ester linkages to a polyethylene segment. Such a compound is therefore a "monomer" within the meaning of the present invention, not withstanding the presence of a polyethylene segment therein. In contrast, the term "reactive oligomer" refers to compounds having more than about two repeating units derived from or related to the reactive functionality of the oligomer.

Although it is contemplated that a wide variety of polyfunctional reactive monomers and reactive oligomers may be used in combination to produce acceptable crosslinking agents according to the present invention, it is preferred that at least about 25 wt % of the crosslinking agent is comprised of polyfunctional reactive monomer. Furthermore, applicants have found that it is generally preferred for the crosslinking agent to contain reactive monomers having a functionality of at least about 3. According to especially preferred embodiments, at least about 5% by weight of the crosslinking agent is comprised of reactive monomers having a functionality of at least about 3. For embodiments in which the crosslinking agent consists essentially of reactive monomers, it is preferred that from about 25% to about 35% by weight of the reactive monomers have a functionality of at least about 5 and that from about 50% to about 100% by weight of the monomers have a functionality of at least about 3.

In accordance with certain highly preferred embodiments, the crosslinking agent comprises a combination of reactive monomer and reactive oligomer. In such embodiments, it is preferred that the weight ratio of oligomer to monomer be no greater than about 2:1, more preferably no greater than about 1:1 and even more preferably no greater than about 0.8:1. The crosslinking agents which comprise a combination of monomers and oligomers also preferably comprise from about 50% to about 85% by weight of polyfunctional reactive monomer and from about 15% to about 50% by weight of reactive oligomer. Applicants have found that crosslinking agents comprising about 60% by weight of polyfunctional reactive monomer and about 40% by weight of reactive oligomer are preferred.

The reactive monomers and reactive oligomers of the present invention are preferably unsaturated organic compounds which can be induced to undergo free radical polymerization. In general, the preferred monomer structure may be represented by the following general formula:

$$CH_2=CHR$$

wherein the R group is an organic unit, a halogen, or pseudo halogen ligand.

As is known, initiation of free radical polymerization generally requires the production of free radicals in the presence of the unsaturated monomer and/or unsaturated oligomer. In accordance with the present invention, it is contemplated that the initial free radicals can be produced directly from the monomer and/or oligomer, for example, by irradiation of the coating composition with high energy radiation. It is generally preferred, however, that the crosslinking agent of the present invention also include an initiator, which, upon exposure to preselected curing conditions, will yield initiating radicals. As is known in the art, such radical initiation can be achieved by thermal decomposition, by irradiation, or by redox reactions. For reasons explained more fully hereinafter, it is generally preferred that the crosslinking agent of the present invention comprises a radiation initiator, and even more preferably an initiator which produces free radicals upon exposure to light, and even more preferably ultraviolet light. Such initiators are sometimes referred to herein as "photoinitiators" and/or "photosensitizers". Preferred photoinitiators for use in accordance with the present invention, comprise a eutectic mixture of benzophenone (50%) and 1 hydroxycylohexylphenyl ketone (50%) sold by CIBA-Geigy under the trade designation "IRGACURE 500." The photoinitiator may also comprise hydroxymethyphenyl propanone (HMPP), which is also sold by CIBA-Geigy under the trade designation "DAROCUR 1173." For embodiments in which the crosslinking agent consists essentially of acrylate ester monomers in which at least about 80% of the monomers have a functionality of about 3 or greater, applicants have found that the crosslinking agent preferably contains from about 0.5% to about 5% by weight of photoinitiator.

It will be appreciated that certain monomeric and oligomeric materials absorb certain wavelengths of light and can disassociate directly into free radicals and are therefore self-initiating. According to certain embodiments of the present invention, therefore, it is contemplated that an initiator, and particularly a photoinitiator, is not required. In general, however, it is contemplated that the present compositions will comprise from about 0.05% to about 5% by weight of photoinitiator, and even more preferably from about 0.5 to about 2% by weight. Furthermore, it is generally preferred that the present compositions do not include any substantial or significant amount thermal initiators, for reasons explained more fully hereinafter. Thus, while certain initiators produce free radicals by exposure to heat as well as by exposure to light, it is generally preferred that such dual function initiators are also not present in any substantial or significant proportion.

The crosslinking agent of the present invention may also include other components which enhance and/or contribute to the crosslinking reaction of the monomeric and oligomeric materials during the curing process.

It is contemplated that those skilled in the art will be able to select numerous reactive monomers adaptable for use with the present invention. However, the reactive monomeric materials of the present invention are preferably polyfunctional and contain at least two olefinically unsaturated sites in the molecule, with polyfunctional acrylate esters being preferred. In accordance with especially preferred embodiments, the monomers comprise a major proportion by weight of polyfunctional acrylate ester, and even more preferably consist essentially of polyfunctional acrylate ester. The acrylate ester monomers of the present invention preferably have a structure corresponding to the following general formula:

$$(CH_2\!-\!CR\!-\!CO\!-\!O\!-\!)_a X$$

wherein R is H or an alkyl group, wherein a is, in compliance with the functionality of X, an integer greater than about 2, and wherein X is a linear, branched, cyclical saturated or unsaturated aliphatic polyvalent hydrocarbyl radical.

Preferred and typical acrylate ester monomers include:

Ethylene glycol dimethacrylate
Ethylene glycol diacrylate
Diethylene glycol dimethacrylate
Diethylene glycol diacrylate
Triethylene glycol dimethacrylate
Triethylene glycol diacrylate
Tetraethylene glycol dimethacrylate
Tetraethylene glycol diacrylate Polyethylene glycol dimethacrylate
Polyethylene glycol dimeacrylate
1,3-butylene glycol dimethacrylate
1,4-butylene glycol dimethacrylate
1,3-butylene glycol diacrylate
1,4-butylene glycol diacrylate
1,4-butanediol diacrylate
1,6-hexanediol dimethacrylate
1,6-hexanediol diacrylate
Neopentyl glycol diacrylate
Neopentyl glycol dimethacrylate
Bisphenol A dimethacrylate (ethoxylated)
Trimethylol propane trimethacrylate
Trimethylol propane triacrylate
Pentaerythritol tetracrylate
Pentaerythritol tetramethacrylate
1,4-butanediol dimethacrylate.

It will be appreciated that such exemplary monomeric materials are polyfunctional with respect to the reactive acrylate functionality, or to an acrylate analogue thereof, and include difunctional, trifunctional, tetrafunctional, and pentafunctional monomers. Applicants have found that methacrylate ester monomers are preferred because they are relatively free of harmful effects to skin and respiratory tissue.

In accordance with certain aspects of the present invention, the acrylate ester monomers of the present invention comprise the reaction product of alcohol and acrylic acid reagent. The term "acrylic acid reagent" refers to acrylic acid and/or acrylic acid homologs and analogues which are reactive with alcohol. It is contemplated that the reaction of alcohol with acrylic acid reagent may comprise the reaction of one or more alcohols with one or more acrylic acid reagents. The term alcohol, as used herein, refers to any organic compound which comprises one or more hydroxy substituents reactive with acrylic acid reagents. Accordingly, alcohols which may be reacted with acrylic acid reagents include mono-alcohols, diols, triols, and polyols, generally.

In accordance with preferred embodiments of the present invention, the acrylate ester is a polyfunctional acrylate ester comprising the reaction product of diol and acrylic acid reagent. Preferred diols include ethylene glycol, propylene glycol, 1,6-hexanediol and neopentyl glycol.

Examples of reaction products of diol and acrylic acid reagent which are particularly suitable for use as polyfunctional reactive monomers according to the present invention are polyethylene glycol diacrylate and polyethylene glycol dimethacrylate. Acrylic esters which include a polyethylene glycol polymer segment having molecular weights of about 200 include polyethylene glycol 200 diacrylate and polyethylene glycol 200 dimethacrylate. SARTOMER® 259 and SARTOMER® 210 are respective examples of polyethylene glycol 200 diacrylate and polyethylene glycol 200 dimethacrylate monomers which are commercially available from Sartomer Co. of West Chester, Pa. An additional example of a reaction product of diol and acrylic acid reagent which is particularly suitable for use in the compositions of the present invention is 1,6-hexanediol dimethacrylate. This material is commercially available from Sartomer Co. as SARTOMER® 239B.

A further example of a reaction product of diol and acrylic acid which is particularly suitable for use in the present compositions is neopentyl glycol propoxylated diacrylate. Neopentyl glycol propoxylated diacrylate is commercially available from Sartomer Co. as SARTOMER® 9003B and is described in U.S. Pat. No. 4,382,135 which is incorporated herein by reference.

Another example of an acrylate ester which is particularly suitable for use in the present compositions is dipentaerythritol monohydroxy pentaacrylate. Such monomers are commercially available from Sartomer Co. as SARTOMER® 399.

For certain embodiments, it is preferred that the crosslinking agent comprise from about 60% to about 70% by weight of hexane diol dimethacrylate, from about 25% to about 35% by weight of dipentaerythritol monohydroxy pentaacrylate, and from about 1% to about 4% by weight of photoinitiator. Wearlayer compositions containing from about 30% to about 50% by weight of such crosslinking agent have been found to produce excellent scuff resistance and excellent resistance to staining by coal, mustard and shoe polish.

In accordance with other preferred embodiments, the acrylate ester monomers comprise the reaction product of triol and acrylic acid reagent. Preferably, the triol comprises trimethylol propane. An example of a reaction product of triol and acrylic acid reagent for use in the compositions of the present invention is ethoxylated trimethylol propane triacrylate which has the following formula:

Ethoxylated trimethylol propane triacrylate is commercially available from Sartomer Co. as SARTOMER® 454.

In accordance with another embodiment of the present invention, the crosslinking agent preferably comprises reactive monomers and reactive oligomers in an oligomer:monomer weight ratio of from about 0.3:1 to about 0.8:1, and even more preferably about 0.6:1. In embodiments having such oligomer:monomer weight ratios, it is preferred that the monomer comprise a combination of difunctional and trifunctional acrylate esters, with a weight ratio of trifunctional acrylate to difunctional acrylate of from about 0.5 to about 0.7 being preferred. For embodiments in which the oligomer:monomer weight ratio is from about 0.3:1 to about 0.8:1, it is especially preferred that the monomers comprise from about 20% to about 25% by weight of polyethylene glycol 200 diacrylate, from about 35% to about 45% by weight of polyethylene glycol 200 dimethacrylate and from about 35% to about 45% by weight of ethoxylated trimethylol propane triacrylate.

It will be appreciated that in certain embodiments monofunctional monomers may be included in the resinous wearlayer without detracting from the advantageous properties of the present invention. Monofunctional monomers are however generally not preferred.

While it is contemplated that several reactive oligomers may be adaptable for use with the present invention, it is believed that the selection of such oligomers for use as a component of the crosslinking agent of the present invention must be done with great care. In particular, while applicants do not intend to be bound by or limited to any particular theory, it is believed that the presence of certain oligomeric compounds may greatly detract from the stain resistance of the present compositions. Nevertheless, applicants have found that certain oligomeric acrylic acid derivatives are capable of producing beneficial results.

The term oligomeric acrylic acid derivative is used herein in a non-limiting sense to refer to any oligomeric or polymeric chemical derivative of acrylic acid or an acrylic acid analog. It is preferred that the oligomeric acrylic acid derivative will cure when subjected to curing conditions, for example, UV-curing conditions. The oligomeric acrylic acid derivatives of the present invention may be mono- or multi-functional with respect to acrylic acid and/or acrylic acid analogues. The term, "acrylic acid analog" refers to any chemical compound which includes an acrylic acid moiety, including homologs, isomers and the like of acrylic acid. Examples of acrylic acid analogues include methacrylic acid and various esters, such as methyl methacrylate, ethyl acrylate and ethyl methacrylate.

The oligomeric acrylic acid derivatives of the present invention preferably comprise repeating units which include functional moieties of acrylic acid and/or acrylic acid analogues. Preferably, each such repeating unit, on average, includes at least about one, and even more preferably, at least about two acrylic acid moieties and/or acrylic acid analog moieties.

In accordance with preferred embodiments of the present invention, the oligomeric acrylic acid derivatives comprise melamine acrylic acid resin. Melamines (triaminotriazines) are generally understood to refer to materials which have been N-alkylated with formaldehyde to provide a methylolated or partially methylolated melamine, which may then, if desired, be further derivatized. Melamines have found wide use in coatings for automobiles, paperboard and the like. U.S. Pat. Nos. 4,281,091; 4,293,461; 4,517,327; 4,554,319; 4,634,738; 4,808,652; and 4,582,894, each of which is incorporated herein by reference, describe various melamine acrylic acid resins, such resins being suitable for use as reactive oligomers in the coating compositions of the present invention.

A particularly preferred melamine acrylic acid resin for use in the compositions of the present invention is methylated, acrylated melamine formaldehyde resin, commercially available from Monsanto Chemical Co. of Springfield, Mass. under the trade designation AM® 146. Such resin has the following formula with n equal to about 2.8.

Other suitable melamine acrylic acid derivatives, in addition to those described above, are believed to be suitable for use in the present compositions. It is believed that those with skill in the art will be able to formulate the present compositions using such melamine acrylic acid derivative resins without undue experimentation in view of the present disclosure.

Applicants have found that the crosslinking agents employed in accordance with the present invention are important not only to the properties of the coating composition, but also to the final properties of the wearlayer, such as flexibility, adhesion, toughness and hardness. In particular, it is believed that at least certain of the preferred monomeric acrylate esters described above act as viscosity reducing agents for the present coating compositions and hence enhance the Theological properties of the coating compositions prior to curing. After the crosslinking agent is crosslinked in accordance with the procedures described hereinafter, these materials contribute to many of the beneficial characteristics of the final surface covering product.

B. The Thermoplastic Polymer

It will be appreciated that the requirements of the thermoplastic polymer component of the present invention can be satisfied by a large number of compounds and that, in view of the present disclosure, one skilled in the art is capable of selecting such material for any particular application without undue experimentation. Accordingly, all such materials are within the scope of the present invention. It is preferred, however, that the thermoplastic polymer comprise polymeric particles which are readily combined with the plasticizer to form a smooth, stable fluid plastisol paste, as described more fully hereinafter.

The thermoplastic polymer of the present invention preferably comprise vinyl polymers and even more preferably vinyl chloride polymers. The vinyl chloride polymers can be simple, unmixed homopolymers of vinyl chloride or block copolymers, terpolymers or the like thereof in which the essential polymeric structure of polyvinyl chloride is interspersed at intervals with residues of the other ethylenically unsaturated compounds polymerized therewith. Furthermore, it is contemplated that mixtures and combinations of the above may be employed. It is contemplated that comonomers may include, for example: vinyl halides such as vinyl bromide and vinyl fluoride; vinyl esters such as vinyl acetate, vinyl chloroacetate, vinyl butyrate, other fatty acid vinyl esters, vinyl alkyl sulfonates and the like; vinyl ethers, such as vinyl ethylether, vinyl isopropyl ether, vinyl chloroethyl ether and the like; cyclic unsaturated compounds such as styrene, the mono- and poly-chloro styrenes, coumarone, indene, vinyl naphthalenes, vinyl pyridines, vinyl pyrrole and the like; vinylidene compounds, such as vinylidene chloride, vinylidene bromide, vinylidene fluorochloride and the like; unsaturated hydrocarbons such as ethylene, propylene, isobutene and the like; allyl compounds, such as allyl acetate, allyl chloride, allyl ethylether and the like; and conjugated and cross-conjugated ethlynically unsaturated compounds such as butadiene, isoprene, chloroprene, 2,3,dimethylbutadiene-1,3-piperylene, divinyl ketone and the like.

According to certain embodiments, the PVC dispersion resin has an average molecular weight of about 100,000. Although vinyl chloride resins are preferred, it is contemplated that the present compositions may be formed using other thermoplastic polymeric material, and in its broadest sense the invention is not intended to be necessarily limited to any particular thermoplastic polymer or polymer groups since many other types and groups of polymers may be selected in view of the guidance of the present disclosure without undue experimentation.

C. Plasticizer

As mentioned hereinbefore, plasticizer generally functions so as to increase the workability, flexibility and/or distensibility of the thermoplastic polymeric material of the present invention.

The liquid plasticizer is preferably selected on the basis of its compatibility with the resin constituent of the composition, that is, its ability to produce a gel, and ultimately a fully fused solid, when the composition is heated. As is well known to those skilled in the art, plasticizers are generally high boiling, chemically and thermally stable organic liquids, low-melting solids or semi-solids. The present plasticizers affect several properties of the present compositions. For example, the plasticizer can have an effect on the rheology of the present fluid plastisols compositions as well as on the strength and flexibility of the fused and cured plastisols. With the guidance provided herein, it is expected that one skilled in the art will be capable of selecting the plasticizer needed for any particular application without undue experimentation. In general, however, it is highly preferred that the plasticizer be readily mixable with the particular thermoplastic polymer to form a homogenous composition which resists exudation of the plasticizer. Furthermore, the plasticizers preferably have the ability to fluidize, solvate, gel and eventually fuse with the thermoplastic polymer. In this regard, it is believed that the plasticizers of the present invention achieve the desired result through external plasticization of the present compositions. That is, the present plasticizers interact physically with the thermoplastic polymeric material to reduce the mutual attractive forces between the polymer chains. Accordingly, while the compositions of the present invention may include a certain amount of internal plasticization, such as, for example, copolymerization, this is not believed to be necessary for operation of the present invention. Accordingly, the plasticizers of the present invention preferably serve to aid in the processing characteristics of the fluid plastisols to impart flexibility, elongation and toughness to the fused plastisol compositions. Another desirable property of the plasticizers of the present invention is thermal and oxidative stability since such materials are generally exposed to high temperatures, such as 350° F. and higher, during processing and use. For this reason anti-oxidants, such as biphenyl A, may optionally be employed in the present compositions.

It is contemplated that the amount of plasticizer used in the compositions of the present invention can vary within the limits described above, depending upon such factors as the desired properties and uses of the composition, the characteristics of the thermoplastic polymer, and the like.

The plasticizers of the present invention preferably comprise ester compounds such as monomeric phthalate esters, dibasic acid esters, trimellitates, phosphate esters and polyesters, with monomeric phthalate esters being the most preferred. Monomeric phthalate esters employed according to the present invention are preferably selected from the group comprising dibutyl phthalate (DBP), dibutoxy ethyl phthalate (DBEP), butyl benzyl phthalate (BBP), butyl octyl phthalate (BOP), dihexyl phthalate (DHP), dioctyl phthalate (DOP), diisooctyl phthalate (DIOP), dicapryl phthalate (DCP), dicapryldioctyl phthalate (DCOP), diisononyl phthalate (DINP), diisodecyl phthalate (DIDP), ditridecyl phthalate and mixtures of these. Dibasic acid esters used as plasticizers according to the present invention are preferably selected from the group comprised of adipate esters, azelate esters and sebecate esters, and mixtures of these. Adipate esters are preferably selected from the group comprising dioctyl adipates (DOA), diisononyl adipate (DINA), diisodecyl adipate (DIDA) and mixtures of these. The azelate esters are preferably selected from the group comprising dioctyl azelate (DOZ), diisooctyl azelate (DIOZ), di-n-hexyl azelate and mixtures of these. When sebecate esters are used, dibutyl sebecate, dioctyl sebecate, dibenzyl sebecate, butyl benzyl sebecate and mixtures of these are preferred. Phosphate esters used as plasticizers according to the present invention are preferably selected from the group comprising tricresyl phosphate, cresyl diphenyl phosphate, octyl diphenyl phosphate and mixtures of these.

It is also contemplated that glycol benzoates, glycol butyrates, citrates, isophthalates, and aliphatic and aromatic hydrocarbons and chlorinated hydrocarbons may also be used alone or in combination with those plasticizers described above.

According to certain preferred embodiments, the plasticizer is a plasticizer mixture comprising: dioctyl adipate or isooctyl adipate.

D. Other Components

The present compositions may also contain other constituents as are known and available, including: heat stabilizers, light stabilizers; coloring agents and pigments, such as titanium dioxide; solvents and diluents, such as methyl ethyl ketone, mineral spirits, etc.; fillers such as clay and limestone; viscosity improvers; anti-oxidants; bacteriostats and bactericides; surfactants; optical brighteners and many other conventional and well known additives and improvement agents. The specific nature and particular physical and chemical properties of these additives do not, in general, relate to the essence of the present inventive concept and, further specific elaboration of such additives is believed not to be required.

It is particularly preferred that small amounts of stabilizers, such as heat and light stabilizers, well-known in the art of making polyvinyl chloride compositions, be incorporated into the present compositions to minimize the effects of degeneration by light and heat. Primary stabilizers ordinarily used are metallo organic compounds, salts or complexes containing a metal component such as cadmium, zinc, lead, tin, barium or calcium combined with an alanine constituent such as ottowate, 2 ethyl hexowate, napthenate, tallate, benzoate, oxide, acetate, stearate, phenate, fluorate, caprylate, phosphite, phthalate, maleate, fumarate, carbonate, sulfate, silicate, alkyl mercaptide or mercapto acid salts and esters. The present compositions preferably include from about 0.5% to about 4% by weight of heat and light stabilizers. A particularly preferred stabilizer is a barium zinc stabilizer sold under the trade designation "Thermcheck 6252."

A flattening agent such as fine silica may be used for conventional purposes to change the gloss and shine of the coating. Useful silica flattening agents are porous particulate materials with a pore volume of from about 0.4 to about 4.0 milligrams and a particle size of from about 3 to about 15 microns. The compositions of the present invention preferably include flattening agents in an amount of from about 1% to about 7% by weight, depending upon the gloss desired. A particularly preferred flattening agent is diatomaceous earth.

According to certain embodiments, the coating compositions of the present invention also preferably include a viscosity depressant for regulating and controlling the viscosity of the coating agent to the desired level. Such a viscosity control agent is present in an amount of from about 0.5 to about 3.0 of the composition. Particularly preferred viscosity control agents are aromatic hydrocarbons, aliphatic hydrocarbons and mixtures of these. An example of an aromatic viscosity control agent is a narrow cut aromatic hydrocarbon having a flash point of about 145° F., sold under the trade designation "EXXON A-150." An example of an aliphatic viscosity control agent is a mixture of aliphatic hydrocarbons containing a polysiloxane copolymer sold under the trade designation "BYK 4015" by BYK-Chemie, USA.

Other filler materials, such as titanium dioxide, carbon black, calcium carbonate and the like may be added for reinforcement, to adjust density, and/or cost.

II. THE PREPARATION METHODS

As described hereinbefore, the present coating compositions comprise three important ingredients: thermoplastic resin, plasticizer for the thermoplastic resin and reactive crosslinking agent. It is contemplated that different methods may be used with varying degrees of success to produce compositions which satisfy at least certain objects of the present invention. However, the two preparation methods described herein have been utilized successfully.

A. First Embodiment

Applicants have found that it is preferred in certain embodiments to prepare a first mixture containing the thermoplastic resin and the plasticizer and a second mixture containing the components of the crosslinking agent and to then combine the first and second mixtures to produce the coating composition.

It is preferred that the first mixture be prepared in the form of a plastisol. In such embodiments, the thermoplastic resin is preferably particulate solid dispersed or suspended in the plasticizer. As used herein, the term "plasticizer" is used in a broad, non-limiting sense and refers generally to materials and agents adapted to disperse, suspend, or solvate the first polymeric material of the present compositions but which are generally nonreactive under the conditions used to cure the present compositions. The term "plasticizer" also refers to a substance or material which is incorporated in the resin in order to increase its workability, flexibility or distensibility. Substantially uniform, homogeneous suspensions or dispersions of fine polymeric solids in liquid plasticizer are known as fluid plastisols. Such dispersions or suspensions generally take the form of relatively viscous, coatable fluids, such as pastes.

The particular mixing techniques which may be used to form such plastisol compositions are generally well known in the art. In general, plastisols are formed by simply mixing the particulate resin material into the plasticizer with sufficient shearing action to ensure a reasonable dispersion of the resin particles in the plasticizer. As will be understood by those skilled in the art, preparation of fluid plastisols may be accomplished using a variety of mixing techniques, including both high and low speed mixing. The object of the mixing step utilized to formulate plastisols is to obtain a uniform dispersion of the thermoplastic particles in the plasticizer without overheating the mixture. One aspect of such a mixing procedure results in the resin particles being wetted out and, to some degree, swelled and solvated by the plasticizer.

The second mixture contains the crosslinking agent of the present invention. This second mixture is prepared by admixing the components of the crosslinking agent, such as the polyfunctional monomers and oligomers described more fully hereinbefore, together with whatever other components of the crosslinking agent may be present. Applicants have found that it is preferred to introduce the crosslinking agent of the present invention into the composition after the plastisol has been formed. At least in certain embodiments, several unexpected advantages are obtained when such a method is utilized. For example, applicants have found that the gloss level of the wearlayers produced from the present coating compositions may be higher using the preparation techniques described herein when compared to other preparation techniques. While applicants do not intend to be bound by or limited to any particular theory, it is believed that exposure of the thermoplastic resin particles to the components of the crosslinking agent during a high sheer mixing operation results in such crosslinking agents swelling or solvating the thermoplastic resin particles. Such swelling or salvation of the thermoplastic resin particles by the crosslinking agent not only creates difficulty in the mixing process, it appears to reduce the gloss level of ceratin of the cured compositions. Accordingly, in this first embodiment it is preferred that the crosslinking agent of the present invention be introduced into a preformed plastisol mixture.

B. Second Embodiment

In accordance with a second preferred embodiment, the present coating compositions are formed by methods which comprise forming a first mixture comprising the liquid components and then introducing the solid components of the coating composition into the first mixture. Applicants have found that this mixing method is especially preferred for coating compositions which contain reactive oligomer.

It is contemplated that numerous embodiments of the present invention will utilize plasticizers, reactive monomers, viscosity control agents, and reactive oligomers that are liquid or paste-like at room temperature and in which the thermoplastic resin and photoinitiator are solids at room temperature. According to such embodiments, it is therefore preferred that the preparation methods comprise forming a first mixture comprising plasticizer, monomer, and reactive oligomer. Where liquid viscosity control agents are included in the coating composition, these materials are also preferably included in this first mixture. The thermoplastic resin, and preferably PVC resin in particulate form, is introduced into this first mixture. It is also preferred that whatever photoinitiator component may be present is introduced into the first mixture. Although it is contemplated that the solid photoinitiator component may be introduced into the mixture before, during and/or after the thermoplastic resin component has been introduced, it is generally preferred that the photoinitiator be introduced into the mixture after the thermoplastic resin is introduced.

The first mixture is preferably formed under high sheer conditions. This may be carried out, for example, by introducing the liquid components into a high sheer mixer, such as a Cowles® mixer. It is also generally preferred that the temperature of the ingredients during the preparation method does not exceed about 90° F.

III. THE SURFACE COVERING PRODUCTS

The compositions of the present invention are suitable for use in connection with substantially any product which requires protective coatings or layers. Thus, the present invention provides products which are especially well adapted to act as surface coverings for various support surfaces, for example, floors and walls, and various identification products, for example, labels and emblems. In its broadest aspect, the surface covering products of the present invention comprise a layer of the cured coating compositions of the present invention.

One embodiment of the surface covering aspects of the present invention will now be generally described in connection with FIG. 1, which is illustrative but not limiting of the invention.

Referring to the drawing, wherein like numerals refer to like elements, there is illustrated a portion of resilient surface covering 10. The surface covering 10 comprises a base layer or substrate 11 comprising a relatively flat sheet backing material 12. A backing 12 preferably overlies by an intermediate or base layer 13 of resinous composition. An ink composition is preferably deposited on the surface of the intermediate or base resinous layer, either randomly or in the form of a pattern or design, as illustrated in FIG. 1 as layer 18. An intermediate wearlayer 19, is supplied substantially uniformly over the layer 18 of printing ink. Traffic bearing wearlayer 20, comprising the coating compositions of the present invention, is applied over the intermediate wearlayer 19. The elements of the preferred constructions of the present products are described in greater detail hereinafter.

A. Substrate

The base layer or substrate 11 may comprise a relatively flat, fibrous backing sheet material 12 and/or a blown or unblown resinous polymer composition, such as shown in the figures as layer 13, having a chemically embossed, mechanically embossed or unembossed surface and/or other relatively flat sheet material.

A relatively flat, backing web or sheet material 12 may be used, if desired or required, as the base layer or substrate 11 for the resinous polymer sheet materials 10 of the present products. Such a backing sheet material 12 may comprise a felted or matted fibrous sheet of overlapping, intermingled fibers and/or filaments, such as a non-woven mat, such as fiberglass or polyester based mats. Further, the backing sheet 12 may comprise a non-woven, knitted, woven or otherwise textile fabricated construction; a sheet of resinous polymer composition; or paper or paper product or similar or like equivalent constructions and materials. Furthermore, the present substrate may be considered to comprise a laminate or composite of one or more of the above-noted materials. A felted fibrous sheet material comprising fibers, such as fiberglass, cellulose, cotton, jute, or rayon; or synthetic or man-made fibers and/or filaments, such as polyolefins, polyamides, acrylics, etc., is the most commonly employed backing material but many others are equally suitable and utilizable in certain embodiments. Such backing sheets are well known and available to those skilled in the art and are described, for example, in U.S. Pat. Nos. 3,293,094; 3,293,108; 3,660,186; and 4,274,916, each of which is assigned to the assignee of the present invention and incorporated herein by reference.

The thickness of such relatively flat backing sheet material depends upon numerous and varied factors, including the particular surface covering product which is to be made and the particular subsequent use for which it is intended. Normally, such thicknesses are in the range of from about 10 mils to about 90 mils, but other thicknesses, especially those greater than 90 mils, may be used.

B. The Resinous Base Layer

The relatively flat backing sheet material 12 may be used by itself as a base layer or a substrate, or it may be used in conjunction with other sheet materials, such as, for example, a layer 13 of potentially foamable or non-foamable resinous polymer composition. According to certain embodiments, the relatively flat backing sheet material 12 may be omitted completely and the foamable or non-foamable resinous polymer composition 13 may be used by itself as a substrate or backing material. Such resinous polymer compositions may be made by well known standard and conventional methods and may contain one or more synthetic resins, such as polymer or co-polymer of vinyl chloride, or other resins as the main constituent resin. Other constituents of such resinous polymer composition may include one or more of the ingredients described in connection with the composition aspects of the present invention.

Although a polymer or co-polymer of vinyl chloride in the form of a plastisol is the preferred and typical synthetic resin to be incorporated into the resinous polymer composition used in the backing layer 11, many other resins are equally applicable, not only in plastisol form, but also in organosol, latex or solvent form.

For products in which the resinous layer 13 is a foamed or foamable resinous layer, it is preferred that such layer include a blowing or foaming agent, when blowing or foaming is desired or required. Many acceptable blowing or foaming agents are contemplated for use within the scope of the present invention. Such specific foaming or blowing agent does not relate to the essence of the present invention and many other suitable and acceptable blowing or foaming agents are to be noted in the previously mentioned United States patents.

If no backing sheet material such as felted or matted fibrous web is to be used, then the plastisol may be doctored by a doctor blade or roll coated, or poured, or cast, or otherwise applied to a strippable carrier which may be a steel belt, a rubber belt, release paper or a felt or other fabric having release coating thereon and subsequently stripped therefrom. However, if a backing sheet material is to be used and is to remain as part of the final product, then the plastisol may be doctored by a doctor blade, or roll coated, or cast, or otherwise applied and adhered to the carrying sheet material in a substantially uniform manner in a relatively uniform thin coating by procedures well known in the art. The thickness of such a plastisol coating, when in the form of a foamable resinous polymer composition, as applied and still wet, is in the range of from about 5 to about 50 mils, or even more if preferred or desired. After the plastisol has been applied to the carrying/backing sheet and blown or foamed, the layer 13 of resinous material will typically have a thickness of from about 20 to about 40 mils.

C. The Printing Ink Layer

Overlaying the substrate 11, including base resinous layer 13 is a layer 18 of a suitable printing ink composition in the desired or required pattern or design. The particular pattern, design and color of the printing ink layer does not relate to the essence of the present invention and any suitable pattern or design may be selected.

Figure 1:
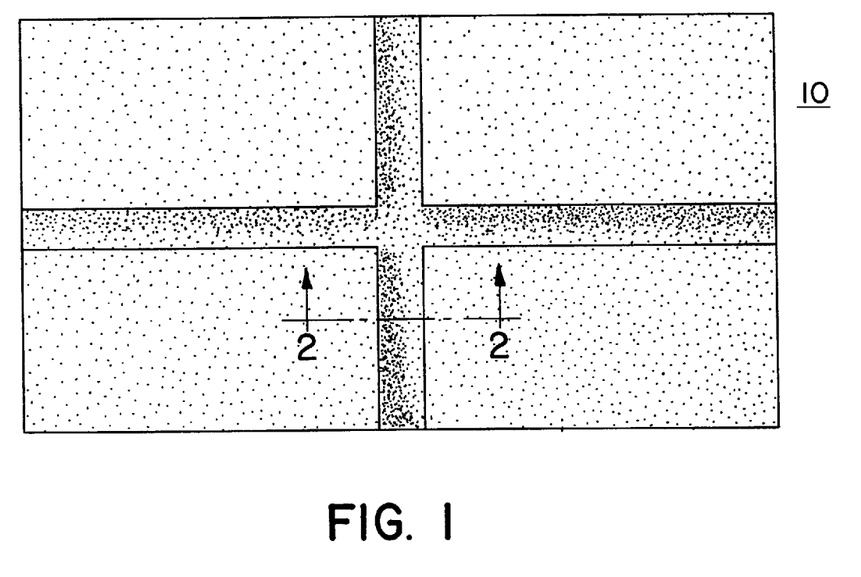
Figure 2:
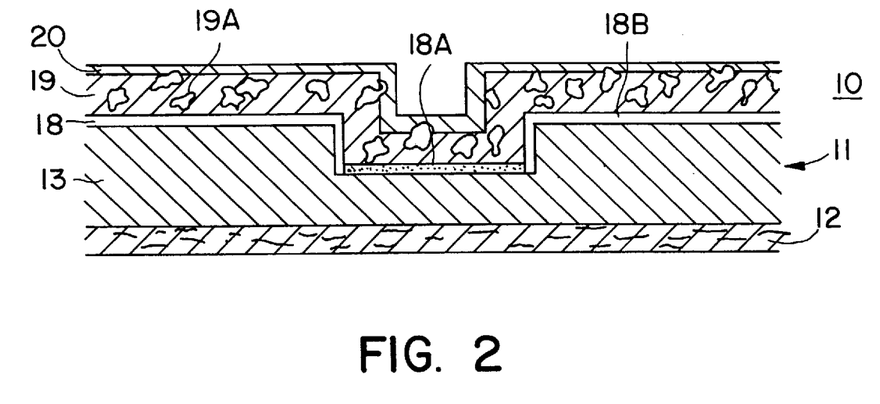

According to preferred embodiments in which the resinous layer 13 is a foamable or blowable resinous layer, as illustrated in FIG. 1, it is preferred that the pattern or design of the printing ink layer include certain predetermined areas or colors 18A which contain a blowing modifier, such as an inhibitor and/or initiator or catalyst. However, other predetermined areas or colors 18B do not contain any such blowing modifier or any such initiator or catalyst. If different levels of the height of the blowing or foaming effect is desired, then predetermined parts or portions of the pattern or design layer 18 may contain a blow modifier or inhibitor in different amounts, concentrations, or types, and so forth, depending upon the variety of differential blowing or foaming effects desired. The blowing or foaming aspects of the present product do not relate to the essence of the inventive concept of the present invention, and some typical and well known conventional and printing ink compositions are noted in the previously described United States patents.

D. The Intermediate Wearlayer

The present products contain a layer or coating 19 which overlies the printing ink layer and may comprise decorative elements. For the purposes of convenience, this layer is referred to herein as the intermediate wearlayer. The intermediate wearlayer may comprise one or more polymeric materials, including a polymer or co-polymer of vinyl chloride. Particularly preferred for forming the intermediate wearlayer are poly(vinyl chloride) plastisol compositions of the general type described hereinbefore. In addition, the intermediate wearlayer may comprise a vinyl matrix having decorative elements, such as dry blend resin filled chips, and the like distributed therethrough. An example of a flooring product including a vinyl matrix having distributed filled chips is MARATHON®, commercially available from the assignee of the present application.

The thickness of the intermediate wearlayer can vary over a relatively wide range, and in the main, will be governed by the functional and/or aesthetic characteristics desired in the product. For most applications, it is believed that the thickness of the decorative layer will be from about 0.003 to about 0.040 inch, with the preferred thickness being from about 0.004 to about 0.025 inch.

E. The Traffic Bearing Wearlayer

Applied over and adhered to the intermediate wearlayer is a topcoat 20 which comprises the compositions of the present invention. The coating compositions, as described hereinbefore, are applied to the intermediate wearlayer in a desired thickness. The coating compositions may be applied in a wet thickness of from about 0.0005 inch to greater than about 0.025 inch, if desired. However, the present coating compositions, and especially the coating compositions having a viscosity of from about 100 to about 800 cps at room temperature, may be applied in thicknesses ranging from about 0.001 to about 0.005 inch.

The step of applying the present coating composition to the substrate may comprise any one of myriad techniques commonly employed for coating a liquid onto a surface. For example, it is contemplated that the coating composition can be applied by means of a direct roll coater, spray coating, curtain coating, extrusion coating and the like. For the purposes of simplicity and cost, it is preferred, however, that the step of applying the coating composition comprise application by the reverse roll coating technique. The reverse roll coater is a well-known device that has been used in the past to apply a coating composition in a continuous fashion to a moving surface. In the use of a reverse roll coater, the liquid composition is applied to the receiving surface by means of a roll which is rotated in a direction opposite to that in which the receiving surface is moved. The reverse roll coater typically employs at least two rolls, one of which is an applicator roll, that is, the roll which carries and applies the liquid composition to the receiving surface. The other roll is termed the metering roll and is positioned relative to the applicator roll in a manner such that a space is provided between the two rolls to permit the liquid composition to flow therethrough at a desired rate. The metering roll rotates in the same direction as the direction of the applicator roll. Typically, the liquid composition is fed to the nip between the metering roll and applicator roll in a manner such that a pool of the liquid composition builds up in the nip. The applicator roll carries composition from the pool to the receiving surface. In preferred form, the applicator and metering rolls are typically made from elastomeric materials such as synthetic rubbers.

The present compositions are preferably applied in thicknesses of up to about 0.004 inch using the reverse roll coating technique, and it is especially preferred that the coating compositions are not substantially preheated prior to application.

The present coating composition is then processed, by exposure to heat and/or actinic radiation, to convert the coating composition to the solid, wear resistant wearlayer composition having the beneficial and advantageous features described above. The presence of such a wearlayer as the topcoat on a surface covering product, and particularly a floor covering product, contributes significantly to the value of such surface covering product.

As is known to those skilled in the art, the manufacture of flooring products which comprise layers of polyvinyl chloride resin typically requires subjecting the flooring product or an intermediate thereof to one or more heating steps. For example, the production of sheet vinyl flooring products having a cushioned or foamed backing typically requires the application of heat to a foamable plastisol layer in order to create the foamed or cellular structure in one or more layers of the product. Furthermore, the use of relatively high temperatures, that is, temperatures of from about 300° F. to about 450° F., are required in order to obtain a fused, wear resistant polyvinyl chloride layer.

Accordingly, after the wearlayer containing the polymerizable crosslinking agent has been applied and adhered to the substrate, the composite containing the present coating composition is heated in an oven or other suitable heating device for a period of time and under temperature conditions sufficient to gel and fuse the coating composition. It is contemplated that fusion of the present coating composition may be effected in accordance with any one of several well known techniques for fusing PVC plastisol layers, and no further description of this process is required. It should be noted, however, that the step of heating the coating composition so as to cause fusion may, in certain embodiments, also initiate the process of curing the crosslinking agent. In general, however, it is preferred that the present crosslinking agent is substantially heat stable at the conditions used to fuse the plastisol. That is, it is preferred that the temperature and the time used to fuse the coating compositions is not so great as to bring about a thermal polymerization of the reactive polymerizable monomers and oligomers in the wearlayer. In this way, the step of curing the present coating compositions may be advantageously decoupled from the fusion step. Applicants have found that such advantageous processing procedures produce excellent results according to the present invention.

After or simultaneous with the fusion step, the coating composition is then subject to actinic radiation curing, preferably ultraviolet radiation, so as to polymerize and/or crosslink the crosslinking agent and preferably so as to thereby produce a crosslinked, interpenetrating polymer network. It is contemplated that various degrees of crosslinking may be utilized in accordance with the present invention. Thus, in certain embodiments it may be preferred that a predetermined portion of the monomer and/or oligomer remains uncrosslinked or does not participate in the polymerization reaction. In general, however, it is preferred that a substantial portion of the monomers and oligomers are crosslinked, and it is even more preferred that substantially all of the monomers and oligomers participate in the crosslinking reaction. One technique for determining whether the degree of crosslinking includes substantially all of the monomers and oligomers comprises observing the tackiness of the crosslinked film or layer. As is well known, a film or layer which exhibits substantially no tackiness is considered to be substantially completely cured.

There are many irradiation techniques which can be employed to initiate curing and to promote crosslinking of the surface coatings according to the present invention. Electron beam, gama, and X-ray treatment are examples of very high energy irradiation techniques which promote extremely rapid polymerization. In general, such techniques are not preferred unless they are used at relatively low levels. For the purposes of the present invention, ultraviolet radiation techniques are preferred.

Sources of ultraviolet radiation can be mercury vapor arc lamps, plasma arcs, polst xenon lamps, and carbon arcs. Mercury vapor arc lamps are currently the most commonly used and consist of three types: low; medium; and high pressures. High pressure mercury arc lamps are the most intense source of ultraviolet, being ten times more powerful than the medium pressure lamps, but they operate at very high temperatures, thus water cooling is generally required.

The radiation can be carried out in the presence of nitrogen gases, oxygen gases, and mixtures of these. Mixtures of oxygen and nitrogen are sometimes preferred, with air also being a preferred gaseous material. Those skilled in the art will appreciate, however, that oxygen gas may act as a crosslinking inhibitor in certain embodiments.

The volumes of nitrogen or air maintained across the web having the curable coating composition will depend mainly on the line speed and the opening gap between the web and the lamps. A high enough flow of nitrogen is preferred to maintain oxygen levels within predetermined limits. Whether the ultraviolet coating may be an air or nitrogen curable coating, sufficient gas sweep (nitrogen or air) is preferred because at operating temperatures in the range 100° F. to 180° F. there may be some volatilization of reactive monomers in the ultraviolet lamping which must be removed. Otherwise such volatile materials will deposit on the lamps and reflectors and degrade operations. The resulting deposition and degradation of reactive monomers leads to loss of efficiency of the ultraviolet lamps and, consequently can lead to incomplete cure.

The invention will now be illustrated in more detail with reference to the following specific, non-limiting examples.

EXAMPLE 1

This example illustrates the preparation of a high gloss, multi-layered floor covering comprising a carrier substrate having adhered to one side thereof a base resinous layer. Although this example illustrates the use of a semi-continuous process, it will be appreciated that the present invention may be carried out in all forms of processing, from batch to fully continuous.

The flooring product includes an intermediate resinous layer and a wearlayer composition of the present invention covers and serves as the wear surface of the flooring product. The details of the process and materials used to produce this floor covering are described below.

About 14 mils (0.014") of a standard plastisol are coated onto a carrier substrate having a thickness of about 28 mils (0.028") according to prior art techniques. The carrier substrate, which is fed from a roll thereof, is about 12' wide and comprises a felt backing.

The foamable plastisol comprises the following.

|  | Amts., lbs. |
|---|---|
| Goodrich Geon 180 x 10 dispersion grade PVC Resin | 450 |
| Occidental 567 dispersion grade PVC PVC Resin | 250 |
| plasticizer | 350 |
| alkyl & aryl hydrocarbons | 40 |
| 2% Mildewcide in BBP | 70 |
| mineral spirits | 3 |
| blowing agent | 39 |
| filler | 300 |
| Total Weight | 1502 |

The plastisol has a Brookfield viscosity of about 1100–2700 cps@80° F.–95° F.).

The foamable plastisol supported by the carrier substrate is gelled. The 2-ply composite is wound into a roll and conveyed to a printing station. At the printing station, the roll is unwound and a pattern is printed on the surface of the gelled foamable plastisol by means of a rotogravure press. For this purpose, there is used an embossing composition which includes therein pigment and an inhibitor for deactivating the blowing agent in certain regions of the gelled foamable plastisol. (As described in U.S. Pat. No. 3,292,094, assigned to the same assignee as the present invention, the inhibitor, upon coming into contact with the blowing agent, has the effect of raising the temperature at which the blowing agent "blows". Thus, when the gelled foamable plastisol is fused by heating the composite to an elevated temperature at a later stage of the manufacturing process, the selected portions of the plastisol that are printed with the embossing composition are not expanded, expansion being limited to those portions of the plastisol which are foamed as a result of the activation of the blowing agent.) The printed gelled composite is then wound and returned to the coating station.

At the coating station, the printed gelled composite is unwound and is coated with a standard PVC plastisol by means of a reverse roll coater to form an intermediate wearlayer. The liquid resinous composition is applied to the surface of the printed gelled composite in a thickness of about 6 mil (0,006 in.) by the reverse roll coater. The coating composition comprises a fusible fluid plastisol comprising the following constituents.

|  | Amts., lbs. |
|---|---|
| OXY 80HC dispersion grade PVC | 550 |
| Borden 440 x 2 dispersion grade PVC | 300 |
| OXY BR501 suspension grade PVC | 50 |
| 2,2,4 trimethyl-1,3-pentanediol diisobutyrate (Eastman TXIB) | 137 |
| alkyl glycol butyrate and alkyl alkyl glycol benzoate plasticizer (Occidental N6000) | 162 |
| alkyl benzyl phthalate plasticizer (Monsanto S261) | 180 |
| aryl and alkyl hydrocarbons | 80 |
| heat/light stabilizers | 29 |
| epoxy soybean oil (Witco Drapex6.8) | 45 |
| Total Weight | 1533 |

The plastisol has a Brookfield viscosity of about 1000 cps. This composition is delivered from the pond of the reverse roll coater to the coater for application onto the surface of the aforedescribed printed gelled composite under the following conditions.

|  |  |
|---|---|
| intermediate wearlayer application (mils) | 6 |
| line speed (fpm) | 82 |
| backing roll speed (fpm) | 80 |
| applicator roll (fpm) | 148 |
| metering roll (fpm) | 2–3 |
| casting ratio | 1.8 |
| nip settings (mils) | 6 |

The intermediate wearlayer coating is gelled in an oven of the air-circulating type having six (6) zones. Zone temperatures (°F.) are as follows: (1) 295; (2) 340; (3) 340; (4) 340; (5) 340; and (6) 340. The product having the gelled intermediate wearlayer is returned to the fusion line for further processing with the composition of the present invention.

At the fusion line, the composite is unwound and is coated with the present composition utilizing a reverse roll coater. A liquid resinous composition of the present invention is applied to the surface of the printed gelled composite in a thickness of about 4 mil by the reverse roll coater. The coating composition comprises a fusible, UV curable fluid plastisol comprising the constituents shown in Table 1A which follows.

TABLE 1A

| | Amts., wt % |
|---|---|
| Borden 440 × 2 dispersion grade PVC | 43.3 |
| Dioctyl adipate (Monsanto DOA - plasticizer) | 8.7 |
| Aromatic and paraffinic hydrocarbons (Monsanto S375) | 2.2 |
| aryl and alkyl hydrocarbons (Exon Aromatic 150) | 1.7 |
| heat/light stabilizers (Synpron #1559 and BYK 4015) | 4.0 |
| 1,6 Hexanediol dimethacrylate (Sartomer 239) | 27.0 |
| Dipentaerythritol monohydroxy penta acrylate (Sartomer 399) | 12.0 |
| Photoinitiator (Irgacure 500) | 1.3 |

The coating composition has a Brookfield viscosity of about 200–300 cps@77° F. (as measured by Brookfield viscometer).

The coating composition is prepared as follows. The plasticizers, along with heat stabilizers, light stabilizers, and diluents are added to a high shear Cowles® mixer. The liquids are blended together. The dispersion grade resin is then added to the plasticizer/stabilizer blend. The plastisol is then mixed for about 6–8 minutes to insure proper dispersion of the resins. The temperature and viscosity of the plastisol are measured as a check for proper dispersion. The plastisol is then degassed to remove air that is induced from the mixing process. The reactive monomers and photoinitiators are then mixed under gentle mixing conditions at room temperature to produce a crosslinking agent. The crosslinking agent and the plastisol are then gently mixed at room temperature to produce a coating composition according to the present invention.

The resulting coating composition is fed from the bottom of the mixing vessel to the reservoir of a reverse roll coater through a 3" diameter hose. This composition is delivered from the reservoir of the reverse roll coater to the coater for application onto the surface of the aforedescribed composite under the following conditions.

| top coating (mils) | 4 |
|---|---|
| line speed (fpm) | 56 |
| backing roll speed (fpm) | 55 |
| applicator roll (fpm) | 84 |
| metering roll (fpm) | 2–3 |
| casting ratio | 1.5 |
| nip settings (mils) | 6–7 |

The composite having the coating composition of the present invention is then converted to the wearlayer composition of the present invention by processing first in a fusion oven and then in a UV oven. Gelling of the top coat and fusion of the base layer, intermediate layer and top layer is effected in an oven of the air-circulating type having five (5) zones in operation. Zone temperatures (°F.) are as follows: (1) 295; (2) 350; (3) 401; (4) 401; and (5) 393.

After passing through the fusion oven, the fused composite is exposed to UV radiation in a seven lamp UV oven. All lamp intensities are set to normal. The oven is blanketed and swept with a nitrogen atmosphere containing from about 200 to about 600 ppm of oxygen.

The resulting flooring product is tested and found to have the characteristics described below in Table 1B:

TABLE 1B

| TEST RESULTS | |
|---|---|
| Coal Tar Stain | 0 |
| Mustard Stain | 0.5 |
| Shoe Polish Stain | 0 |
| Adhesion | P |
| Initial gloss | 90 |
| Flex (100%) | P |
| Scuff Test | P |

As can be observed from Table 1B, the compositions of the present invention provide a scuff resistant support surface which exhibits an initial high gloss and excellent stain resistance.

COMPARATIVE EXAMPLE 1

For each of the coating compositions a–d listed in Table 1C below, the components are mixed together under conditions sufficient to produce a workable fluid mixture.

Each of the coating compositions listed is applied in a thickness of about 0.01 inch to a flexible substrate. The substrate comprises a felt base layer and a layer of standard gelled PVC plastisol. Each coating is then gelled by exposure to heat for about 3 minutes at 300° F., and then fused by exposure to temperatures at about 400° F. for about one minute and 50 seconds. The compositions are then cured by exposure to ultraviolet light in a two-lamp ultraviolet light oven. The coated substrate is passed through the oven at a rate of about 20 feet per minute with the first lamp providing about 200 w/inch and the second lamp providing about 300 w/inch. The curing oven is swept with a nitrogen blanket containing about 150 ppm of oxygen.

The samples are removed from the oven and then tested for scuff resistance. All samples failed the scuff test.

TABLE 1C

| | Concentration, wt % | | | |
|---|---|---|---|---|
| Components | a | b | c | d |
| PVC Resin (Geon 179) | 72.1 | 72.1 | 72.1 | 72.1 |
| Plasticizer (Huls Nuoplaz DOA) | 14.3 | 14.3 | 14.3 | 14.3 |
| Stabilizer | 2.3 | 2.3 | 2.3 | 2.3 |
| Photoinitiator (Irqacure 500) | 0.5 | 0.5 | 0.5 | 0.5 |
| Tetraethyleneglycol dimethacrylate (Sartomer 209) | 10.7 | — | — | — |
| Ethoxylated Bisphanol A diacrylate (Henkel Photomer 4028) | — | 10.7 | — | — |
| Propoxylated Neopentyl glycol diacrylate (Henkel Photomer 4127) | — | — | 10.7 | — |
| 1,b Hexanediol dimethacrylate (Sartomer 239) | — | — | — | 10.7 |
| TOTAL | 100 | 100 | 100 | 100 |

EXAMPLE 2

Each of the coating composition e and f in Table 2 are prepared as follows. The plasticizers, along with heat stabilizers, light stabilizers, and diluents are added to a high shear Cowles® mixer. The liquids are blended together. The dispersion grade resin is then added to the plasticizer/stabilizer blend. The plastisol is then mixed for about 6–8 minutes to insure proper dispersion of the resins. The temperature and viscosity of the plastisol are measured as a check for proper dispersion. The plastisol is then degassed to remove air that is induced from the mixing process. The reactive monomers and photoinitiators are then added to the plastisol under gentle mixing conditions at room temperature to produce a crosslinking agent. The crosslinking agent and the plastisol are then gently mixed at room temperature to produce a coating composition according to the present invention.

Each of the coating compositions e and f in Table 2 is applied in a thickness of about 0.004 inch to a flexible substrate. The substrate comprises a felt base layer and a layer of standard gelled PVC plastisol. Each coating is then gelled by exposure to heat for about 3 minutes at 300° F., and then fused by exposure to temperatures at about 400° F. for about one minute and 50 seconds. The compositions are then cured by exposure to ultraviolet light in a two-lamp ultraviolet light oven. The substrate is passed through the oven at a rate of about 20 feet per minute with the first lamp providing about 200 w/inch and the second lamp providing about 300 w/inch. A nitrogen blanket containing about 150 ppm of oxygen is maintained in the UV curing oven.

The samples are removed from the oven and then tested for scuff and stain resistance. Both samples pass the scuff test. However, sample f produces a wearlayer having stain resistance superior to sample e. As can be seen from Table 2, the crosslinking agent in sample f contains about 30% by weight of pentafunctional acrylate monomer, whereas the crosslinking agent in sample e contains only di- and trifunctional acrylate monomer. It is contemplated that the superior stain resistance of sample f relative to sample e is due, at least in part, to the presence of pentafunctional monomer in the sample.

TABLE 2

| | Concentration, Wt % | |
|---|---|---|
| Components | e | f |
| PVC Resin (Geon 179) | 48.8 | 48.8 |
| Plasticizer (Huls Neoplaz DOA) | 9.8 | 9.8 |
| Aryl and Alkyl Hydrocarbons (Monsanto S452) | 2.4 | 2.4 |
| Viscosity Control (Exon Aromatic 150) | 2.0 | 2.0 |
| Stabilizer | 4.0 | 4.0 |
| Photoinitiator (Irgacure 500) | 0.7 | 0.7 |
| Neopentyl qlycol propoxylated diacrylate (Sartomer 9003) | 9.8 | — |
| Trimethylol propane ethoxylated triacrylate (Henkel Photomer 4149) | 22.0 | 22.0 |
| Dipentaerythritol monohydroxy penta acrylate (Sartomer 399) | — | 9.8 |

EXAMPLE 3

Each of the coating composition g, h and i in Table 3A is prepared as follows. The plasticizers, monomers and oligomers, along with heat stabilizers, light stabilizers, and diluents are added to a high shear Cowles® mixer operated at about 90° F. and about 2700 RPM with a dispersator mixing blade. The liquids are blended together. The PVC resin is then slowly added to the liquid mixture over a period of about 7 minutes. Mixing is then continued for a period of about 3 minutes, at which time the photoinitiator is added to the mixture. Mixing is then continued for a period of about 2 additional minutes. The temperature and viscosity of the plastisol are measured as a check for proper dispersion. The plastisol is then degassed to remove air that is induced from the mixing process.

Each of the coating composition g–i in Table 3A is applied in a thickness of about 0.004 inch to a flexible substrate. The substrate comprises a felt base layer and a layer of standard gelled PVC plastisol. Each coating is then gelled by exposure to heat for about 3 minutes at 300° F., and then fused by exposure to temperatures at about 400° F. for about one minute and 50 seconds. The compositions are then cured by exposure to ultraviolet light in a two-lamp ultraviolet light oven. The substrate is passed through the oven at a rate of about 20 feet per minute with the first lamp providing about 200 w/inch and the second lamp providing about 300 w/inch. A nitrogen blanket containing about 150 ppm of oxygen is maintained in the UV curing oven.

The samples are removed from the oven and then tested for scuff and stain resistance, initial gloss and gloss retention. The results are reported in Table 3A.

As can be seen from Table 3A, sample g contains crosslinking agent comprising reactive monomer and reactive oligomer, the monomer and oligomer together comprising only about 40% by weight of the composition. The oligomer:monomer ratio is about 8.2:1, well above the preferred ratio described herein, and a substantial portion of the oligomer is a non-preferred urethane oligomer. As reported in Table 3B, such a composition fails the scuff tests and shows very poor resistance to staining.

Sample h also contains crosslinking agent comprising reactive monomer and reactive oligomer, the monomer and oligomer together comprising only about 40% by weight of composition. In contrast, however, the monomer:oligomer weight ratio in sample h is about 0.9:1, within the preferred ratio range described herein. Furthermore, the non-preferred urethane oligomer has been eliminated from the composition. As reported in Table 3B, such a composition shows improved resistance to staining relative to sample g.

Sample i contains crosslinking agent which also comprises reactive monomer and reactive oligomer. In this sample, however, the monomer and oligomer together comprise about 58.5% by weight of composition. Moreover, the oligomer:monomer ratio in sample i is about 0.9:1, within the preferred ratio range described herein, and the non-preferred urethane oligomer has been eliminated from the composition. As reported in Table 3B, such a composition shows excellent resistance to staining, excellent resistance to scuffing, high initial gloss and excellent gloss retention.

TABLE 3A

| | Concentration, wt % | | |
|---|---|---|---|
| Components | g | h | i |
| PVC Resin (Borden 440X3) | 42.9 | 42.9 | 28.5 |
| Plasticizer | 11.2 | 11.2 | 7.5 |
| Stabilizer | 3.4 | 3.4 | 2.2 |
| Viscosity Control (Exon Aromatic 150) | 2.6 | 2.6 | 1.8 |
| Polyethyleneglycol 200 dimethacrylate (Sartomer 210) | 1.4 | 4.2 | 8.1 |
| Polyethyleneglycol 600 diacrylate (Sartomer 259) | 2.6 | 7.4 | 14.4 |
| Ethoxylated trimetylol propane triacrylate (Sartomer 454) | 2.4 | 6.9 | 13.5 |
| Melamine Formaldehyde Oligomer (Monsanto AM 146) | 7.2 | 20.8 | 22.5 |
| Urethane Oligomer (Fairad 8205) | 25.6 | — | — |
| Photoinitiator (Irgacure 500) | 1.0 | 1.0 | 0.8 |
| Surfactant (3M FC-430) | 0.1 | 0.1 | 0.1 |

TABLE 3B

|  | g | h | i |
|---|---|---|---|
| Viscosity (cps @ 78° F.) | 10000+ | 500 | 250 |
| Initial Gloss | 76 | 75 | 73 |
| Average Gloss Loss, % | 71 | 94 | 65.5 |
| Scuff Test | F | F | P |
| Stain |  |  |  |
| Coal Tar | 4 | 0 | 0 |
| Mustard | 3 | 1 | 1 |
| Shoe Polish | 3 | 0.5 | 0 |

What is claimed is:

1. A coating composition comprising:
   (a) thermoplastic polymer;
   (b) from about 3% by weight to about 25% by weight of plasticizer for said thermoplastic polymer; and
   (c) at least about 30% by weight of crosslinking agent, the weight ratio of said thermoplastic polymer to said crosslinking agent being no greater than about 2:1.

2. The coating composition of claim 1 wherein said composition comprises from about 40% by weight to about 60% by eight of crosslinking agent.

3. The coating composition of claim 2 wherein the eight ratio of said thermoplastic polymer to said crosslinking agent is no greater than about 1.5:1.

4. The coating composition of claim 2 wherein the weight ratio of said thermoplastic polymer to said crosslinking agent is no greater than about 0.8:1.

5. The coating composition of claim 1 wherein:
   said crosslinking agent consists essentially of polyfunctional monomer, melamine formaldehyde oligomer, and photoinitiator;
   the weight ratio of said thermoplastic polymer to said crosslinking agent is no greater than about 1.5:1; and
   the weight ratio of said melamine formaldehyde oligomer to said polyfunctional monomer is no greater than about 2:1.

6. The coating composition of claim 1 wherein said crosslinking agent comprises from about 0.5% to about 5% by weight of photoinitiator.

7. The coating composition of claim 1 wherein said thermoplastic polymer comprises polyvinyl chloride dispersion resin.

8. The coating composition of claim 7 wherein said composition comprises from about 10% by weight to about 50% by weight of polyvinyl chloride dispersion resin.

9. The coating composition of claim 7 wherein said composition comprises from about 10% by weight to about 50% by weight of polyvinyl chloride dispersion resin having an average molecular weight of about 100,000.

10. The coating composition of claim 1 wherein said composition comprises from about 30% to about 60% by weight of reactive crosslinking agent, said composition when cured being scuff resistant and having:
    an unflattened initial gloss of at least about 70°;
    an average gloss loss of no greater than about 70%; and
    a stain resistance to shoe polish and coal tar of no greater than about 2.

11. The coating composition of claim 1 wherein said crosslinking agent comprises polyfunctional acrylate ester monomer.

12. A gloss retentive wear surface resistant to scuffing and staining comprising a layer of plasticized polymer comprising:
    (a) from about 3% by weight to about 25% by weight of plasticizer;
    (b) thermoplastic polymer fused in said plasticizer; and
    (c) at least about 30% by weight of cured crosslinking agent, said wear surface being scuff resistant and having:
    an unflattened initial gloss of at least about 70°;
    an average gloss loss of no greater than about 70%; and
    a stain resistance to shoe polish and coal tar of no greater than about 2.0.

13. The gloss retentive wear surface of claim 12 wherein said layer of plasticized polymer comprises an interpenetrating polymer network.

14. The gloss retentive wear surface of claim 12 wherein said layer of plasticized polymer comprises from about 40% by weight to about 60% by weight of cured crosslinking agent.

15. The gloss retentive wear surface of claim 12 wherein the weight ratio of said thermoplastic polymer to said cured crosslinking agent is no greater than about 1.5:1.

16. The gloss retentive wear surface of claim 15 wherein the weight ratio of said thermoplastic polymer to said cured crosslinking agent is no greater than about 0.8:1.

17. The gloss retentive wear surface of claim 12 wherein:
    said cured crosslinking agent consists essentially of the polymerization product of polyfunctional acrylate ester monomer, melamine formaldehyde oligomer, and photoinitiator;
    the weight ratio of said thermoplastic polymer to said cured crosslinking agent is no greater than about 1.5:1; and
    the weight ratio of said melamine formaldehyde oligomer to said polyfunctional monomer is no greater than about 2:1.

18. The gloss retentive wear surface of claim 17 wherein said crosslinking agent comprises from about 0.5% to about 5% by weight of photoinitiator.

19. The gloss retentive wear surface of claim 12 wherein said thermoplastic polymer comprises polyvinyl chloride resin.

20. The gloss retentive wear surface of claim 12 wherein said layer of plasticized polymer comprises from about 10% by weight to about 50% by weight of polyvinyl chloride resin.

* * * * *

UNITED STATES PATENT AND TRADEMARK OFFICE
CERTIFICATE OF CORRECTION

PATENT NO. : 5,830,937
DATED : November 3, 1998
INVENTOR(S) : Allen A. Shalov and Anthony N. Piacente It is certified that error appears in the above-identified patent and that said Letters Patent is hereby corrected as shown below:

In Claim 1, Line 2, insert --a-- before "thermoplastic"; Line 2, insert --vinyl-- before "polymer"; Line 3, change "3%" to --7.5%--; Line 3, change "25%" to --15%--; Line 4, insert --vinyl-- before "polymer". In Claim 2, Line 3, change "eight" to --weight--. In Claim 3, Line 1, change "eight" to --weight--; Line 2, insert --vinyl-- before "polymer". In Claim 4, Line 2, insert --vinyl-- before "polymer". In Claim 5, Line 5, insert --vinyl-- before "polymer". In Claim 7, Line 2, insert --vinyl-- before "polymer". In Claim 10, Line 5, insert --(i)-- before "an"; Line 6, insert --(ii)-- before "an"; Line 7, insert --(iii)-- before "a". In Claim 12, Line 4, change "3%" to --7.5%--; Line 4, change "25%" to --15%--; Line 6, insert --a-- before "thermoplastic"; Line 6, insert --vinyl-- before "polymer"; Line 8, after "agent," insert --the weight ratio of said thermoplastic vinyl polymer to said crosslinking agent being no greater than about 2:1,--. In Claim 15, Line 2, insert --vinyl-- before "polymer". In Claim 16, Line 2, insert --vinyl-- before "polymer". In Claim 17, Line 2, insert --(i)-- before "said"; Line 6, insert --(ii)-- before "the"; Line 6, insert --vinyl-- before "polymer"; Line 9, insert --(iii)-- before "the"; Line 9, before "oligomer" delete "melamine formaldehyde" and insert --monomer to said--; Line 10, delete "to said polyfunctional monomer"; Line 11, delete "2:1" and insert therefor --1.5:1--. In Claim 19, Line 2, insert --vinyl-- before "polymer".

Signed and Sealed this

Twenty-eighth Day of September, 1999

Attest:

Attesting Officer

Q. TODD DICKINSON

Acting Commissioner of Patents and Trademarks